United States Patent
McCracken

(10) Patent No.: US 6,532,501 B1
(45) Date of Patent: Mar. 11, 2003

(54) SYSTEM AND METHOD FOR DISTRIBUTING OUTPUT QUEUE SPACE

(75) Inventor: David E. McCracken, San Francisco, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/409,605

(22) Filed: Sep. 30, 1999

(51) Int. Cl.[7] ............................................... G06F 13/00
(52) U.S. Cl. ........................ 710/52; 710/39; 710/54; 710/56; 710/112; 710/309; 710/263; 710/310
(58) Field of Search .............................. 710/54, 39, 52, 710/56, 112, 309, 310, 263

(56) References Cited

U.S. PATENT DOCUMENTS

| | | | | |
|---|---|---|---|---|
| 5,781,533 A | * | 7/1998 | Manning et al. | 370/236 |
| 5,898,671 A | * | 4/1999 | Hunt et al. | 370/235 |
| 5,982,776 A | * | 11/1999 | Manning et al. | 370/414 |
| 6,044,418 A | * | 3/2000 | Muller | 710/56 |
| 6,088,745 A | * | 6/2000 | Bertagna et al. | 710/56 |
| 6,249,819 B1 | * | 6/2001 | Hunt et al. | 709/232 |

* cited by examiner

Primary Examiner—Jeffrey Gaffin
Assistant Examiner—Mohammad O. Farooq
(74) Attorney, Agent, or Firm—Baker Botts L.L.P.

(57) ABSTRACT

A system and method for distributing output queue space is provided that includes an output queue (18), a input queue (12), an asynchronous input queue (14), and a credit allocation module (22). The output queue (18) has a certain number of output spaces (19) where each output space (19) represents an output queue credit. The output queue (18) releases output queue credits when releasing data from output spaces (19) and receives data in response to a command being processed from the input queue (12). The input queue (12) queues commands and requests a number of output queue credits in response to receiving a command. The input queue (12) also releases the queued commands for processing in response to receiving the requested number of output queue credits. The asynchronous input queue (14) queues commands and requests a number of output queue credits in response to receiving a command. The asynchronous input queue (14) also releases the queued commands for processing in response to receiving the requested number of output queue credits. The credit allocation module (22) receives the released output queue credits and disburses the output queue credits in response to requests for output queue credits from the input queue (12) and the asynchronous input queue (14).

21 Claims, 3 Drawing Sheets

SYSTEM AND METHOD FOR DISTRIBUTING OUTPUT QUEUE SPACE

TECHNICAL FIELD OF THE INVENTION

This invention relates in general to the field of computer queue systems, and more particularly to an improved system and method for distributing output queue space.

BACKGROUND OF THE INVENTION

In computer systems, commands such as reads and writes are queued for processing until space is available in an output queue to return the results of the command. Once space becomes available in the output queue, the command is typically released and processed where it returns data or other information into the output queue.

Conventional systems typically have a single input queue through which all commands are processed for a given output queue. However, newer computer system designs may include additional commands in a separate input queue for processing as space permits in the given output queue. Conventional memory systems do not provide for multiple input queues to provide commands for processing and to provide output to a single output queue. Therefore, it is desirable to provide a system for distributing output queue space between multiple command input queues.

SUMMARY OF THE INVENTION

From the foregoing, it may be appreciated that a need has arisen for a system and method for distributing output queue space that provides support for multiple command input queues. In accordance with the present invention, a system and method for distributing output queue space are provided that substantially eliminate and reduce disadvantages and problems associated with conventional output queue space distribution systems.

According to an embodiment of the present invention, a system for distributing output queue space is provided that includes an output queue, an input queue, an asynchronous input queue, and a credit allocation module.

The output queue has a certain number of output spaces where each output space represents an output queue credit for the output queue. The output queue is operable to release output queue credits when releasing data from output spaces in the output queue and to receive data in response to a command being processed from the input queue. The input queue is operable to queue commands and to request a number of output queue credits in response to receiving a command in the input queue. The input queue is further operable to release the queued commands for processing in response to receiving the requested number of output queue credits. The asynchronous input queue is operable to queue commands and to request a number of output queue credits in response to receiving a command in the asynchronous input queue. The asynchronous input queue is further operable to release the queued commands for processing in response to receiving the requested number of output queue credits. The credit allocation module is operable to receive the released output queue credits and to disburse the output queue credits in response to requests for output queue credits from the input queue and the asynchronous input queue.

The present invention provides various technical advantages over conventional output queue space distribution systems. For example, one technical advantage is that multiple command input queues may provide commands for processing and for providing output to a single output queue. Another technical advantage is that an arbitrator coupled to one of the input queues can perform its arbitration duties without knowing a status of other input queues. Other technical advantages may be readily apparent to one skilled in the art from the following figures, description and claims.

BRIEF DESCRIPTION OF THE DRAWINGS

For a more complete understanding of the present invention and the advantages thereof, reference is now made to the following description taken in conjunction with the accompanying drawings, in which like reference numbers represent like parts, and in which.

DETAILED DESCRIPTION OF THE INVENTION

Figure 1:
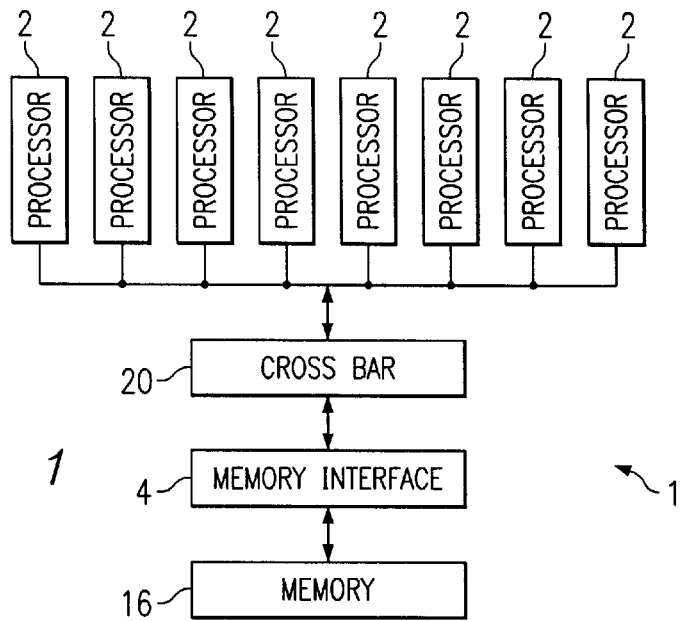
FIG. 1 is a block diagram illustrating a multiprocessor computer system.

Referring to FIG. 1, a multiprocessor computer system is generally indicated at 1. Multiprocessor computer system 1 includes a plurality of processors 2 coupled to a crossbar 20. Crossbar 20 is further coupled to a memory interface 4. Memory interface 4 is further coupled to memory 16. Crossbar 20 distributes messages, commands, requests, and returned data between various parts of multiprocessor computer system 1. In one embodiment, crossbar 20 distributes messages, commands, requests, and returned data between the plurality of processors 2 and memory interface 4. Memory interface 4 includes memory command input queues, returned memory data output queues, and output queue allocation logic.

Figure 2:
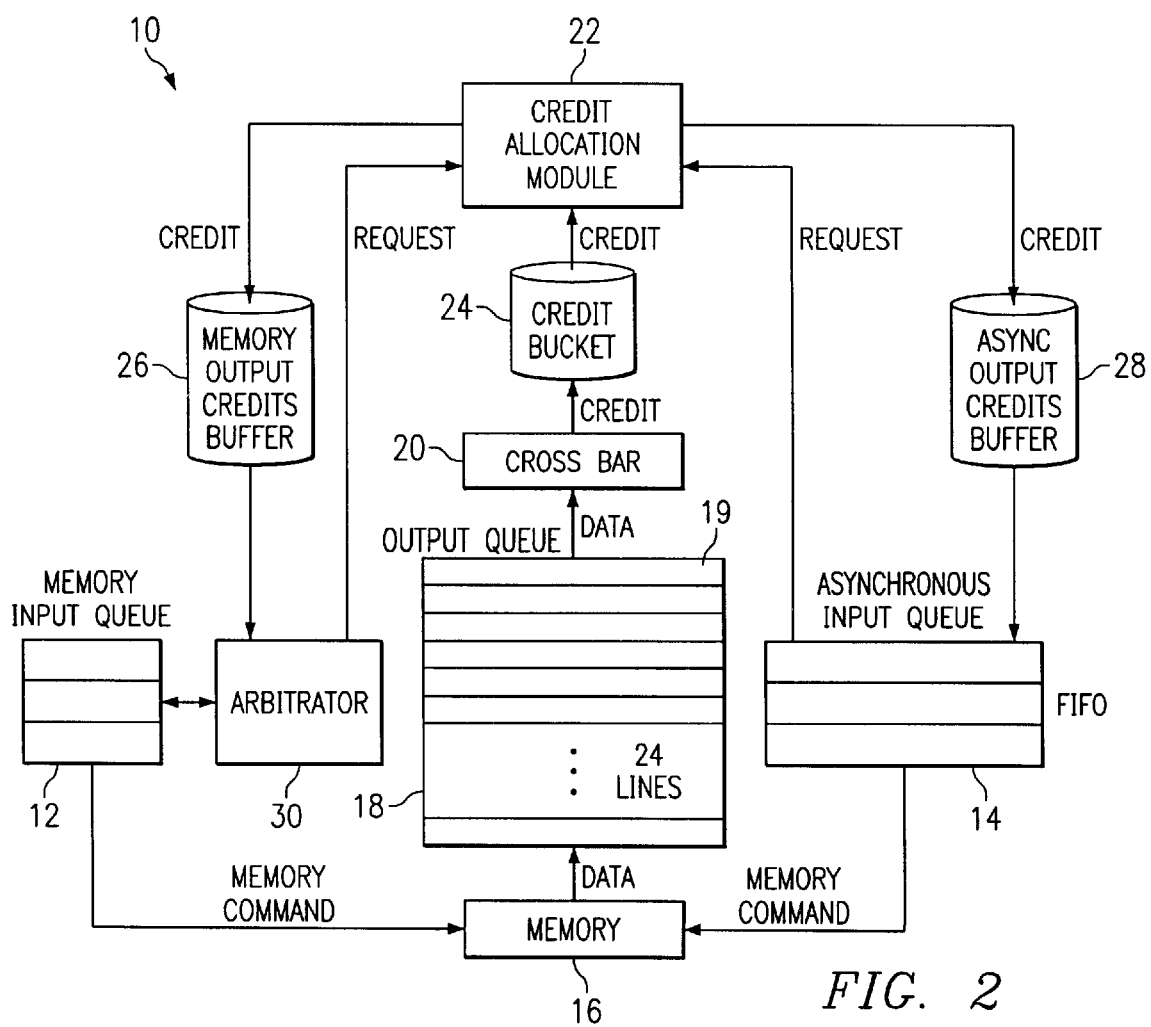
FIG. 2 is a block diagram illustrating a system for distributing output queue space.

Referring to FIG. 2, a system for distributing output queue space in a computer system 1 is generally indicated at 10. Multiprocessor computer system 1 may include several input queues and output queues for various purposes. One type of input queue and output queue are used with a computer memory to queue and process commands against the computer memory. However, the system for distributing output queue space 10 may also be used with any general purpose output queue or any specific purpose output queue within multiprocessor computer system 1. In one embodiment, the system for distributing output queue space 10 is generally used with a computer memory system within a computer processing system. Although the remainder of this disclosure will discuss the present invention with relation to input queues and an output queue for use with a computer memory system, the present invention applies equally to use with any output queue and any input queue within multiprocessor computer system 1.

A memory input queue 12 and an asynchronous input queue 14 provide memory commands to a memory 16. The memory commands include memory operations such as reads and writes. An output queue 18 receives data from memory 16 after the memory commands are processed. A system crossbar 20 takes data from output queue 18 and distributes it to the section of the computer system that submitted the memory command. Since the computer system includes two memory command input queues, a system is needed to distribute output queue space between the two memory command input queues.

The system for distributing output queue space 10 is a credit-based distribution system. Output queue 18 includes a certain number of output spaces 19 where each output space 19 is equivalent to one output queue credit. In one embodiment, output queue 18 includes twenty-four output spaces 19 and, thus, is equivalent to twenty-four output queue credits. Each memory command in memory input queue 12 and asynchronous input queue 14 requires a certain number of output queue credits before it can process. In one embodiment, each memory command uses a memory cache line that requires eight output queue credits to be processed. Thus, the data forwarded to output queue 18 from memory 16 in response to the memory command would utilize eight output spaces 19 in output queue 18. Since there are a finite number of output queue credits available, credit allocation module 22 determines how those output queue credits will be allocated between memory input queue 12 and asynchronous input queue 14. Once enough output queue credits are accumulated, a memory command from memory input queue 12 or asynchronous input queue 14 will be released and processed.

A credit allocation module 22 includes a credit bucket 24. Credit allocation module 22 decides how to distribute the credits accumulated in credit bucket 24. Credit allocation module 22 distributes credits to a memory output credits buffer 26 and an asynchronous output credits buffer 28. An arbitrator 30 is coupled to memory input queue 12 and determines which entry in memory input queue 12 should be processed first.

Since memory input queue 12 receives synchronous memory commands from the computer system, processes on the computer system are waiting for the results to be returned from the memory command. Because of the synchronous nature of the memory commands in memory input queue 12, arbitrator 30 determines in what order the memory commands should be processed. In another embodiment, memory input queue 12 may be any type of input queue including an asynchronous input queue. Arbitrator 30 determines the number of output queue credits needed for processing each time a decision is made to release a memory command for processing. In one embodiment, arbitrator 30 maintains a constant request for a maximum number of output queue credits to be placed in memory output credits buffer 26. In that embodiment, the maximum number of output queue credits is sixteen. The memory output credits buffer 26 can accumulate a maximum of sixteen output queue credits and can accumulate credits even when no commands are present in memory input queue 12. By maintaining a constant request for the maximum number of credits, arbitrator 30 insures that sufficient output queue credits are available in memory output credits buffer 26 to process any command that may arrive in memory input queue 12. Therefore, in this embodiment, arbitrator 30 does not make a request for output queue credits to credit allocation module 22 since a request for the maximum number of credits is continuously made. Output queue credits accumulate up to the requested number and are not replenished until a command is released from memory input queue 12 thereby using some of the output queue credits available in memory output credits buffer 26. In another embodiment, a request for output queue credits is sent to credit allocation module 22 and remains active until credit allocation module 22 fills the request by forwarding an appropriate number of output queue credits to memory output credits buffer 26. Once memory output credits buffer 26 contains sufficient output queue credits to process the memory command selected by arbitrator 30, the selected memory command is released and processed thereby filling the available output space 19 in the output queue 18. In one embodiment, the request for output queue credits is represented by the existence of a memory command in memory input queue 12.

Memory input queue 12 receives memory commands from the computer system and temporarily stores the memory commands for processing until output space 19, in the form of output queue credits, becomes available in output queue 18. Arbitrator 30 determines the order in which the memory commands in memory input queue 12 will be released and processed. In one embodiment, the oldest memory command in memory input queue 12 requires eight output queue credits for processing while newer memory commands in memory input queue 12 require sixteen output queue credits for processing. Newer memory commands in memory input queue 12 require sixteen output queue credits so that after processing the newer memory commands, eight output queue credits are left to process the oldest memory command in memory input queue 12. This prevents the oldest memory command from permanently remaining in memory input queue 12 by assuring that output queue credits are available to process the oldest memory command even if it is not chosen by arbitrator 30 to be processed first.

Asynchronous input queue 14 receives memory commands from the computer system. Asynchronous input queue 14 is a FIFO (first in, first out) queue. As the name implies, memory commands in asynchronous input queue 14 are asynchronous and, therefore, can be processed as output space 19 becomes available in output queue 18. In another embodiment, asynchronous input queue 14 may be any type of input queue including a synchronous input queue. Although the memory commands in asynchronous input queue 14 are asynchronous, they need to be processed eventually. Therefore, the system 10 cannot starve the asynchronous input queue 14 of output queue credits. When asynchronous input queue 14 receives a memory command, a request is sent for an appropriate number of output queue credits. In one embodiment, the request for output queue credits is represented by the existence of a memory command in asynchronous input queue 14. In one embodiment, the number of output queue credits needed for each memory command is eight.

Once asynchronous output credits buffer 28 accumulates an adequate number of output queue credits, asynchronous input queue 14 releases the next memory command for processing. The memory command is processed against memory 16 and data is returned into output queue 18 thereby using the output queue credits. It is important to note that output queue credits are only distributed to asynchronous output credits buffer 28 if a memory command is waiting to be processed in the queue. In addition, output queue credits are distributed up to the number needed by each buffer. Any excess output queue credits are held in credit bucket 24.

Since there is a continuous request from arbitrator 30 for sixteen output queue credits to be placed in memory output credits buffer 26, output queue credits may be distributed to memory output credits buffer 26 even if no commands are present in memory input queue 12.

If asynchronous input queue 14 has a command waiting to process and memory output credits buffer 26 has its maximum of sixteen output queue credits, any output queue credit received by credit allocation module 22 in credit bucket 24 will be distributed to asynchronous output credits buffer 28. If asynchronous input queue 14 does not have a command waiting to be processed and memory output credits buffer 26 has less than its maximum of sixteen output queue credits, any output queue credits received by credit allocation module 22 in credit bucket 24 will be forwarded to memory output credits buffer 26 until memory output credits buffer 26 accumulates its maximum of sixteen output queue credits. Recall that memory output credits buffer 26 may receive output queue credits even if no commands are in memory input queue 12 waiting to be processed.

If asynchronous input queue 14 has a command waiting to be processed and memory output credits buffer 26 has less than its maximum of sixteen output queue credits, any output queue credits received by credit allocation module 22 in credit bucket 24 are allocated one at a time first to memory output credits buffer 26 and then to asynchronous output credits buffer 28 until the requested number of output queue credits are delivered to each buffer or there are no remaining output queue credits in credit bucket 24. If credit bucket 24 distributes all available output queue credits before the buffer requests are filled, credit allocation module 22 tracks the recipient of the last output queue credit so that the next available output queue credit may be forwarded to the other output credits buffer thereby maintaining the alternating distribution of output queue credits.

Figure 3:
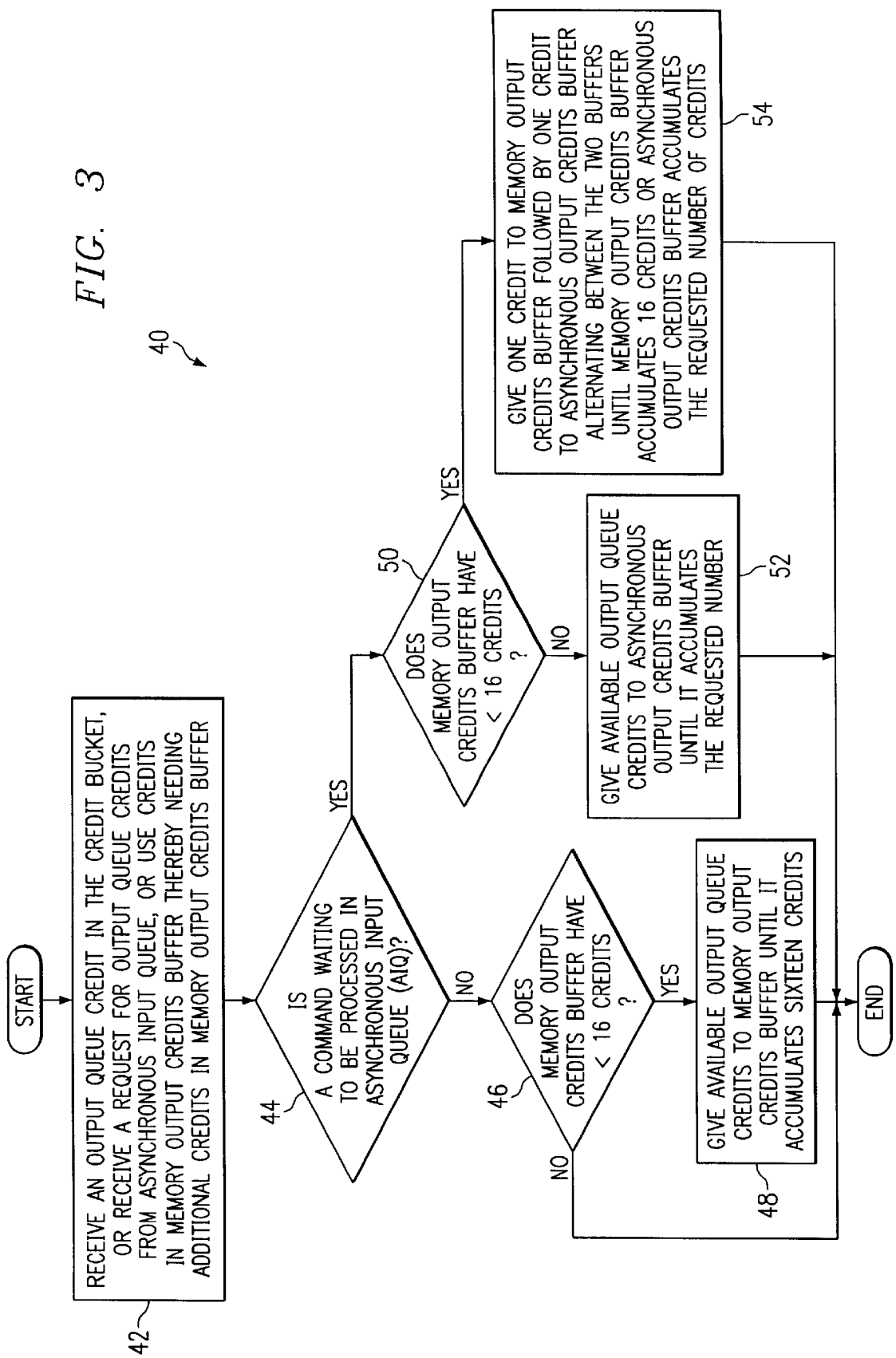
FIG. 3 is a flow diagram illustrating a method for distributing output queue space.

Referring to FIG. 3, a method for distributing memory output queue space is generally indicated at 40. Method 40 illustrates the method used in credit allocation module 22 for allocating output queue credits received in credit bucket 24. The method commences at step 42 where an output queue credit is received in credit bucket 24, a request for output queue credits is received from asynchronous input queue 14, or output queue credits from memory output credits buffer 26 are used thereby reducing the output queue credits available in memory output credits buffer 26 below the maximum of sixteen. Recall that memory output credits buffer 26 has a continuous request to accumulate sixteen output queue credits. System crossbar 20 releases one output space 19 at a time and, therefore, releases one output queue credit at a time to credit bucket 24. In another embodiment, system crossbar 20 releases output queue credits in blocks of eight corresponding to the memory 16 cache line size. Output queue credits are potentially distributed each time an output queue credit is received in credit bucket 24, each time a memory command is received in asynchronous input queue 14, or each time a command is released from memory input queue 12. Output queue credits may accumulate in credit bucket 24 if there are no memory commands in asynchronous input queue 14 and memory output credits buffer 26 has accumulated its maximum of sixteen credits.

The method proceeds to decisional step 44 where a determination is made regarding whether asynchronous input queue 14 has a command waiting to be processed. If asynchronous input queue 14 does not have a command waiting to be processed, the NO branch of decisional step 44 proceeds to decisional step 46 where a determination is made regarding whether memory output credits buffer 26 has less than its maximum of sixteen credits. If memory output credits buffer 26 does not have less than its maximum of sixteen credits, then NO branch of decisional step 46 terminates the method. If the method proceeds to this point, output queue credits are accumulated in credit bucket 24.

If memory output credits buffer 26 has less than its maximum of sixteen credits, the YES branch of decisional step 46 proceeds to step 48 where the available output queue credits in credit bucket 24 are distributed to memory output credits buffer 26 until memory output credits buffer 26 accumulates its maximum of sixteen credits. Recall that memory output credits buffer 26 can accumulate output queue credits regardless of whether memory input queue 12 has a pending command. After step 48, the method terminates.

Returning to decisional step 44, if asynchronous input queue 14 has a command waiting to be processed, the YES branch of decisional step 44 proceeds to decisional step 50 where a determination is made regarding whether memory output credits buffer 26 has less than its maximum of sixteen credits. If memory output credits buffer 26 does not have less than its maximum of sixteen credits, the NO branch of decisional step 50 proceeds to step 52 where available output queue credits in credit bucket 24 are given to asynchronous output credits bucket 28 until asynchronous output credits buffer 28 accumulates the requested number. Recall that asynchronous input queue 14 requests output queue credits as commands are received in asynchronous input queue 14. After step 52, the method terminates.

If memory output credits buffer 26 has less than its maximum of sixteen credits, the YES branch of decisional step 50 proceeds to step 54 where one output queue credit is alternately forwarded to memory output credits buffer 26 followed by one output queue credit to asynchronous output credits buffer 28 until memory output credits buffer 26 accumulates its maximum of sixteen credits and asynchronous output credits buffer 28 accumulates the requested number of credits. If either input queue is awaiting output queue credits after the last output queue credit is distributed from credit bucket 24, credit allocation module 22 tracks the recipient of the last output queue credit so that the alternate forwarding of output queue credits continues until memory output credits buffer 26 accumulates its maximum of sixteen credits and asynchronous output credits buffer 28 accumulates the requested number of credits. After step 54, the method terminates.

After the output queue credits are distributed to memory output credits buffer 26 and asynchronous output credits buffer 28, memory input queue 12 and asynchronous input queue 14 determine whether adequate output queue credits exist in the respective credits buffer to release and process a memory command. If either input queue needs additional output queue credits and undistributed output queue credits are in credit bucket 24, the input queue needing additional output queue credits repeats the method to obtain more credits. If either input queue has an adequate number of output queue credits, a memory command is released and processed, and the output queue credits needed to process the memory command are subtracted from the appropriate credits buffer. In this way, the total of credit bucket 24, memory output credits buffer 26, and asynchronous output credits buffer 28 should equal the number of output spaces 19 in output queue 18 that are currently available to accept data from memory 16.

Figure 4:
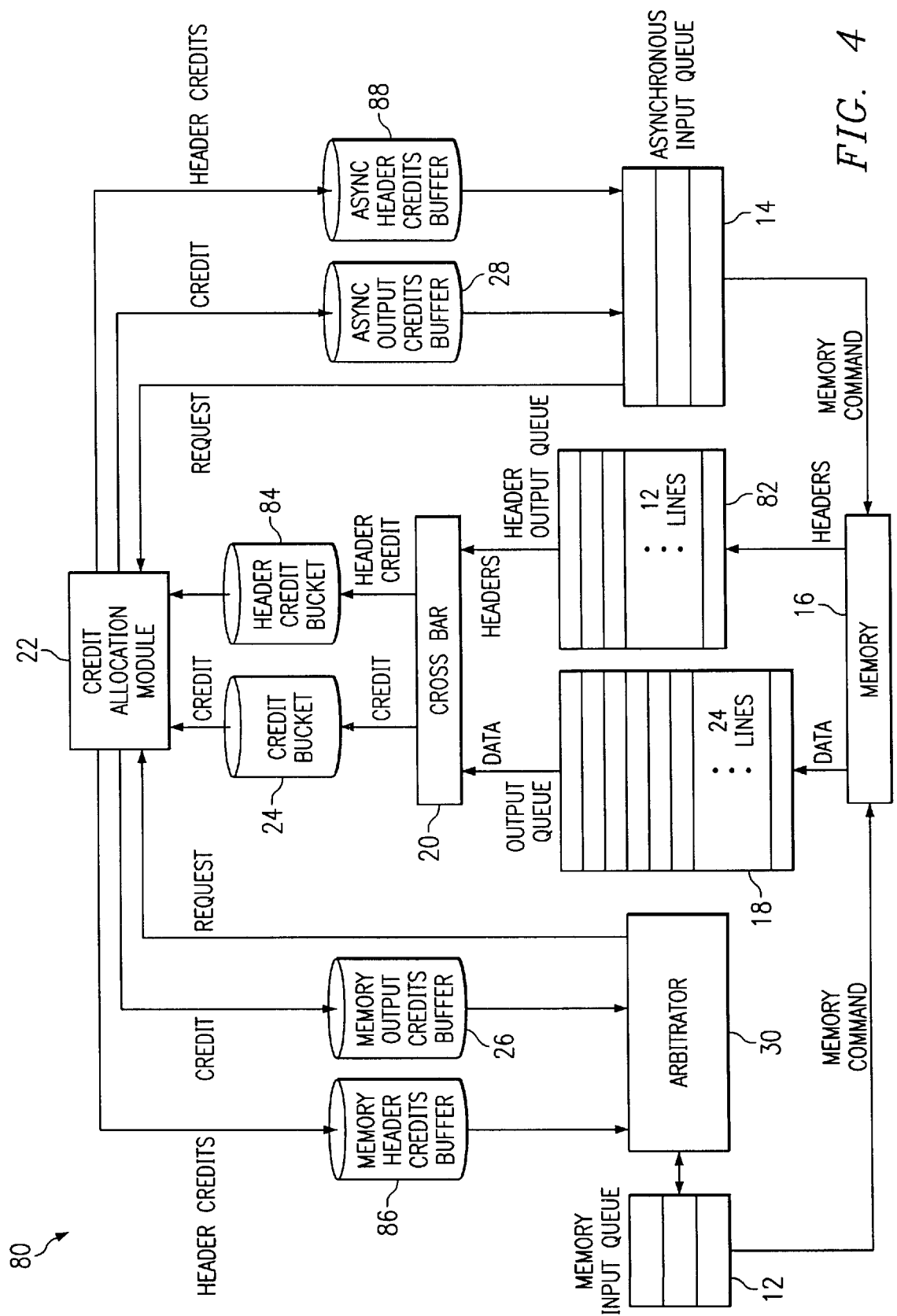
FIG. 4 illustrates an alternate embodiment of the system for distributing output queue space.

Referring to FIG. 4, an alternate embodiment of the system for distributing memory output queue space 10 is generally indicated at 80. In the alternate embodiment, memory commands in memory input queue 12 and asynchronous input queue 14 require space in both output queue 18 and a parallel header output queue 82 before memory commands can be released and processed against memory 16. In addition to the elements previously described with relation to FIG. 2 and FIG. 3, the alternate system for distributing memory output queue space 80 includes the header output queue 82, a header credit bucket 84, a memory header credits 86, and an asynchronous header credits 88. In one embodiment, each eight output queue credits required for a memory command in memory input queue 12 also requires three header credits for header output queue 82. In that embodiment, memory commands in asynchronous input queue 14, in addition to eight output queue credits, require one header credit.

The parallel header credit system functions in the same way as the output queue credit system. Thus, memory commands from either memory input queue 12 or asynchronous input queue 14 are released and processed against memory 16 returning data into output queue 18 and headers into header output queue 82. System crossbar 20 retrieves data from output queue 18 and headers from header output queue 82 and forwards both to the appropriate section of the computer system. At that time, system crossbar 20 releases output queue credits to credit bucket 24 and header credits to header credit bucket 84. Credit allocation module 22 takes credits available in both credit bucket 24 and header credit bucket 84 and similarly distributes the credits. Header credits from header credit bucket 84 are distributed to either memory header credits 86 or asynchronous header credits 88. Memory input queue 12 and asynchronous input queue 14 do not release and process a memory command until sufficient credits are available in both associated credit stores.

Thus, it is apparent that there has been provided, in accordance with the present invention, a system and method for distributing output queue space that satisfies the advantages set forth above including support for multiple memory command input queues. Although the present invention and its advantages have been described in detail, it should be understood that various changes, substitutions, and alterations may be readily apparent to those skilled in the art and may be made herein without departing from the spirit and the scope of the present invention as defined by the following claims.

What is claimed is:

1. A system for distributing output queue space, comprising:
    an output queue having ascertain number of output spaces, each output space being represented by an output queue credit, the output queue operable to release output queue credits when releasing data from output spaces in the output queue, the output queue further operable to receive data in response to a command being processed from an input queue;
    a memory input queue operable to queue commands, the memory input queue further operable to request a number of output queue credits whether or not a command has been received, the memory input queue further operable to release any queued commands for processing in response to receiving the requested number of output queue credits;
    an asynchronous input queue operable to queue commands, the asynchronous input queue further operable to request a number of output queue credits in response to receiving a command to be queued, the asynchronous input queue further operable to release the queued command for processing in response to receiving the requested number of output queue credits;
    a credit allocation module operable to receive the released output queue credits and to disburse the output queue credits in response to requests for output queue credits from the memory input queue and the asynchronous input queue.

2. The system of claim 1, further comprising:
    an arbitrator coupled to the memory input queue and operable to determine a processing order of the queued commands, the arbitrator further operable to request a number of output queue credits needed to process a queued command selected for processing.

3. The system of claim 2, wherein the arbitrator determines that a certain number of output queue credits are needed to process the selected command in response to selecting an oldest command in the memory input queue for processing.

4. The system of claim 3, wherein the certain number is eight.

5. The system of claim 2, wherein the arbitrator determines that a certain number output queue credits are needed to process the selected queued command in the memory input queue in response to selecting a queued command other than an oldest command for processing.

6. The system of claim 5, wherein the certain number is sixteen.

7. The system of claim 1, wherein the number of output queue credits requested by the asynchronous input queue is eight output queue credits.

8. The system of claim 1, wherein the output queue includes twenty-four output spaces.

9. The system of claim 1, wherein the memory input queue maintains a continuous request for a maximum number of output queue credits.

10. The system of claim 9, wherein the maximum number is sixteen.

11. The system of claim 1, further comprising:
    a header output queue having a certain number of header output spaces, each header output space representing a header output queue credit in the header output queue, the header output queue operable to release header output queue credits when releasing headers from header output spaces in the header output queue, the header output queue further operable to receive headers in response to a command being processed from the memory input queue;
    wherein the memory input queue is further operable to request a number of header output queue credits in response to receiving a command in the memory input queue, the memory input queue further operable to release the queued commands for processing in response to receiving the requested number of output queue credits and the requested number of header output queue credits;
    wherein the asynchronous input queue is further operable to request a number of header output queue credits in response to receiving a command in the asynchronous output queue, the asynchronous input queue further operable to release the queued commands for processing in response to receiving the requested number of output queue credits and the requested number of header output queue credits;
    wherein the credit allocation module is further operable to receive the released header output queue credits and to disburse the header output queue credits in response to requests for header output queue credits from the memory input queue and the asynchronous input queue.

12. The system of claim 11, further comprising:
    an arbitrator coupled to the memory input queue and operable to determine a processing order of the queued commands, the arbitrator further operable to request a number of output queue credits and a number of header output queue credits needed to process a queued command selected for processing.

13. The system of claim 12, wherein the arbitrator determines that three header output, queue credits are needed to process the selected command in response to selecting an oldest command in the memory input queue for processing.

14. The system of claim 12, wherein the arbitrator determines that six header output queue credits are needed to process the selected queued command in the memory input queue in response to selecting a queued command other than an oldest command for processing.

15. The system of claim 11, wherein the number of header output queue credits requested by the asynchronous input queue is one header output queue credit.

16. The system of claim 11, wherein the header output queue includes twelve header output spaces.

17. A method for distributing output queue space, comprising:
receiving output queue credits in a credit allocation module;
determining a needed number of output queue credits needed for a memory input queue to reach a maximum number of output queue credits;
determining a requested number of output queue credits requested for processing pending commands in an asynchronous input queue in response to the asynchronous input queue having pending commands;
allocating the needed number of output queue credits to the memory input queue in response to the memory input queue having less than the maximum number of output queue credits and the asynchronous input queue not having pending commands;
allocating the requested number of output queue credits to the asynchronous input queue in response to the asynchronous input queue having pending commands and the memory input queue having a maximum number of output queue credits;
allocating one output queue credit to the memory input queue followed by allocating one output queue credit to the asynchronous input queue and alternating back and forth until the memory input queue accumulates the maximum number of output queue credits and the asynchronous input queue accumulates the needed number of output queue credits in response to the asynchronous input queue having pending commands and the memory input queue having less than the maximum number of output queue credits.

18. The method of claim 17, wherein the maximum number is sixteen.

19. The method of claim 17, further comprising: releasing a command from the memory input queue in response to receiving the needed number of output queue credits.

20. The method of claim 17, further comprising:
releasing a command from the asynchronous input queue in response to receiving the requested number of output queue credits.

21. The method of claim 17, further comprising:
releasing output queue credits in response to an output queue releasing data from the output queue; forwarding the released output queue credits to the credit allocation module.

* * * * *